United States Patent
Fagan et al.

(10) Patent No.: US 7,536,875 B2
(45) Date of Patent: May 26, 2009

(54) METHOD FOR SUPPRESSING METAL CONTAMINATION IN HIGH TEMPERATURE TREATMENT OF MATERIALS

(75) Inventors: James Gerard Fagan, Painted Post, NY (US); Sumalee Likitvanichkul, Painted Post, NY (US); Daniel Raymond Sempolinski, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 406 days.

(21) Appl. No.: 11/357,645

(22) Filed: Feb. 17, 2006

(65) Prior Publication Data

US 2007/0056662 A1    Mar. 15, 2007

(51) Int. Cl.
*C03B 37/00* (2006.01)
(52) U.S. Cl. .................... 65/32.5; 423/335
(58) Field of Classification Search ............ 65/27, 65/32.5; 423/335
See application file for complete search history.

(56) References Cited

U.S. PATENT DOCUMENTS

| | | | |
|---|---|---|---|
| 5,325,230 A | 6/1994 | Yamagata et al. | 359/350 |
| 6,174,509 B1 | 1/2001 | Pavlik, Jr. et al. | 423/337 |
| 6,574,991 B1 * | 6/2003 | Pavlik et al. | 65/27 |
| 6,885,787 B2 | 4/2005 | Antos et al. | 385/15 |
| 2001/0047665 A1 | 12/2001 | Zhang et al. | 65/17.2 |

OTHER PUBLICATIONS

D.L. Fry, P.V. Mohan, and R.W. Lee, "Hydrogen-Deuterium Exchange in Fused Silica" Journal of the Optical Soc. Of America, vol. 50, No. 12, pp. 1321-1322, Dec. 1960.

James E. Shelby, "Quantitative Determination of the Deuteroxyl Content of Vitreous Silica" Communication of the Am. Ceramic Society, vol. 70, No. 1, pp. C-9, C-10, Jan. 1987.

J. E. Shelby, P.L. Mattern, and D. K. Ottesen, "Radiation-induced isotope exchange in vitreous silica" J. Appl. Phys., vol. 50, No. 8, pp. 5533-5535, Aug. 1979.

J. E. Shelby, "Molecular diffusion and solubility of hydrogen isotopes in vitreous silica" Journal of Applied Physics, vol. 48, No. 8, pp. 3387-3394, Aug. 1977.

Robert Pavlik Jr. et al., Purification of Porous Zircon by Carbochlorination, J. Am. Ceram. Soc., 87 [9] 1653-1658 (Sep. 2004).

* cited by examiner

*Primary Examiner*—George Wyszomierski
*Assistant Examiner*—Weiping Zhu
(74) *Attorney, Agent, or Firm*—Robert P. Santandrea; Siwen Chen

(57) ABSTRACT

Disclosed is a method for treating glass and crystalline inorganic materials whereby metal contamination during such process is inhibited. Such process includes treating the material in the presence of a purifying atmosphere comprising a cleansing gas. The process is especially advantageous for treating high purity fused silica glass for use in advanced lithographic devices.

16 Claims, 1 Drawing Sheet

METHOD FOR SUPPRESSING METAL CONTAMINATION IN HIGH TEMPERATURE TREATMENT OF MATERIALS

FIELD OF THE INVENTION

The present invention relates to methods for treating glass or crystalline materials at high temperature. In particular, the present invention relates to methods for treating high purity glass or crystalline materials at high temperature by which metal contamination, especially sodium contamination, is suppressed. The present invention is useful, for example, in the production of high purity silica glass materials at high temperature.

BACKGROUND OF THE INVENTION

Many inorganic materials are processed at high temperature to alter the composition and/or properties thereof. Such processes may involve shaping, such as reflowing, reforming, molding, pressing, cutting, grinding, other machining, and the like. Such processes may also involve crystal formation and growth, annealing, etc. For high purity materials, contamination during such high temperature processing may be a concern. This is especially true for high purity glass and crystalline materials for use in precision optical devices where very low metal concentration can significantly compromise the material performance. The high temperature adds to the concern because under those conditions, contaminants, especially metal ions, are usually more mobile than at lower temperature, thus their concentrations can be high in the treatment environment. Further, contamination at high temperature can occur much faster, even if the inorganic material is already densified. Once contaminated, further purification is usually difficult or impractical for those densified material; as a result parts with an unacceptable level of contamination has to be sacrificed, leading to lower production yield.

Such contamination during high temperature treatment is especially a pronounced problem for high purity synthetic silica glass for use in advanced lithographic devices. Synthetic silica glass finds use in optical elements in lithographic tools and other optical tools, such as laser generators and the like, operating at deep UV and vacuum UV regions. It is known that very low level of metal concentration, typically on the ppb level, are required for high performance lithography devices used in modern-day very-large-scale integrated circuits (VLSI) industry. The production and processing of the materials for such applications involve high temperature treatment such as reforming, annealing, and the like. The environment where such processing takes place, even if constructed with high purity materials, tends to have a higher than desirable sodium concentration. Thus control of metal contamination, especially sodium contamination, is a big problem.

The prior art does not provide a solution to this problem. The solution as presented herein can be extended to high temperature treatment of materials other than silica glass where metal contamination is an issue.

SUMMARY OF THE INVENTION

Accordingly, it is provided a process for treating at a high temperature a glass or crystalline material having a before-treatment initial sodium concentration of [Na](bt) in the surface region lower than or equal to about 300 ppm, in certain embodiments advantageously lower than about 100 ppm, in certain embodiments advantageously lower than 1 ppm, wherein (i) the material is treated in a purifying atmosphere comprising a cleansing gas selected from $F_2$, $Cl_2$, $Br_2$, a halogen-containing compound, and compatible mixtures thereof; (ii) the atmosphere is maintained to have a purity such that at the end of the heat treatment, in the surface region of the treated material, the after-treatment sodium concentration is [Na](at) and [Na](at)≦5 [Na](bt), in certain embodiments advantageously [Na](at)≦2 [Na](bt), in certain embodiments advantageously [Na](at)≦[Na](bt), still in certain embodiments advantageously [Na](at)≦0.5 [Na](bt).

According to a preferred embodiment of the process of the present invention, the material thus treated is high purity glass, in certain embodiments advantageously high purity consolidated fused silica glass. In certain embodiments advantageously, the high purity silica glass is for use in optical members of lithography devices in the deep and vacuum UV region. In another preferred embodiment, the material treated is a single crystal, a polycrystalline material, or a glass-ceramic material.

According to a preferred embodiment of the process of the present invention, [Na](at)≦10 ppb by weight, in certain embodiments advantageously [Na](at)≦5 ppb, in certain embodiments advantageously [Na](at)≦2 ppb, in certain embodiments advantageously [Na](at)≦1 ppb. This embodiment is especially preferred where the material treated is high purity fused silica glass.

In certain embodiments advantageously, the high temperature treatment of the crystalline or glass material is selected from pressing, sagging, reforming, reflowing, machining, drawing, rolling, or other reshaping.

In certain embodiments advantageously, during the high temperature treatment, the purifying atmosphere is a continuous flow or a pulsed flow.

In certain embodiments advantageously the cleansing gas is selected from $F_2$, $Cl_2$, $Br_2$, and halogen-containing compounds such as HF, HCl, HBr, $CF_cCl_dBr_e$ and $SF_xCl_yBr_z$, where c, d, e, x, y and z are non-negative integers, c+d+e=4 and x+y+z=6, and compatible mixtures thereof. In certain embodiments advantageously, the cleansing gas is $Cl_2$. In one embodiment of the process of the present invention, the purifying atmosphere comprises, in addition to the cleansing gas, an inert gas preferably selected from $N_2$ and rare gases such as He, Ne, Ar, Kr and mixtures thereof.

Preferably, in the process of the present invention, the material has a before-treatment initial concentration of at least one metal M in the surface region, [M](bt), and an after-treatment concentration of metal M in the surface region, [M](at), and [M](at)≦5 [M](bt), in certain embodiments advantageously [M](at)≦2 [M](bt), in certain embodiments advantageously [M](at)≦[M](bt), still in certain embodiments advantageously [M](at)≦0.5 [M](bt), and M is selected from alkali metals other than sodium, alkaline earth metals and transition metals. In certain embodiments advantageously, for each individual metal M, [M](bt)≦5 ppb by weight. In certain embodiments advantageously, for all metal M and sodium, Σ([M](bt)+[Na](bt))≦100 ppb by weight.

In certain embodiments advantageously, in the process of the present invention, the treatment is conducted in a furnace constructed with graphite. In certain embodiments advantageously, the graphite material is permeable to the cleansing gas. In certain embodiments advantageously, the furnace material was purified to have a low level of sodium concentration before the material is processed therein. In certain embodiments advantageously, the surface region of the furnace material exposed to the purifying atmosphere during the treatment process has a sodium concentration of lower than 2[Na](at), in certain embodiments advantageously lower than [Na](at), in certain embodiments advantageously lower than 0.5[Na](at).

In one embodiment of the process of the present invention, especially where the material treated is high purity fused silica glass, the treatment comprises subjecting the material to a temperature higher than about 1300° C. In another embodiment of the process of the present invention, the treatment comprises subjecting the material to a temperature of about 1700° C. In these embodiments, it is preferred that the treatment comprises subjecting the material to a continuous flow or pulsed flow of the purifying atmosphere at least when the temperature is between about 800-1300° C., especially where the furnace is constructed with graphite. In certain embodiments, it is preferred that the treatment comprises subjecting the material to the continuous flow or pulsed flow of purifying atmosphere during the whole period when the temperature is higher than about 800° C.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

BRIEF DESCRIPTION OF THE DRAWINGS

In the accompanying drawings.

DETAILED DESCRIPTION OF THE INVENTION

Figure 1:
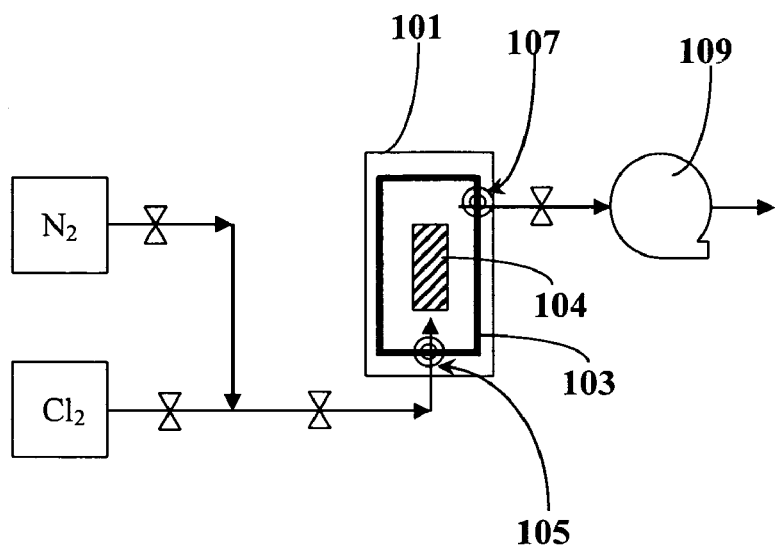
FIG. 1 is a schematic illustration of the furnace set-up for carrying out an embodiment of the process of the present invention.

As used herein, "high temperature" means a temperature higher than 500° C., in certain embodiments advantageously higher than about 800° C.

As used herein, "surface region" means the region of the treated material within 20% of the thickness of the article made of the treated material, or 15 mm depth from the surface thereof, whichever is larger. The concentration of a certain element in the surface region as described in the present application means the average concentration in the surface region of the material.

In certain embodiments advantageously, where the material treated according to the process of the present invention is crystalline, it is preferred that it is non-elemental, single-crystalline or poly-crystalline. For example, the material may be $CaF_2$, $MgF_2$, and oxide crystals.

The production of components for high precision devices, such as optical members used in high precision optical instruments, including but not limited to lithographic devices used in the semiconductor industry, often entail high temperature treatment of crystalline, glass or glass-ceramic materials. Such treatments include, but are not limited to, crystal formation and growth, ceramming, shaping such as machining, pressing, sagging, reflowing, rolling, drawing, and the like. Contamination control during such high temperature treatment is important for many such high-temperature treatments. For example, the production of high purity fused silica glass that is widely used for optical members in lithographic devices, etalons, laser generators, and the like, often comprises a step of high temperature treatment of silica. Contaminants such as metals, including alkali metals, alkaline earth metals and transition metals, are known to be detrimental to the optical properties of such high purity silica glass when it is used in demanding applications such as KrF, ArF and $F_2$ laser lithographic devices and the like. The required level of metals in the silica glass is so low that contamination by such metals during such high temperature treatment has become a serious concern. This is because, first, metal contaminants, especially alkali metal, and sodium in particular, is notoriously ubiquitous and thus may be introduced during handling from the handler, the tools and furnace materials; and second, metals, especially small ions such as sodium ions, have increased diffusivity in fused silica when heated to the treatment temperature. Therefore, utmost care must be taken by the handler in avoiding introducing extraneous sodium and other metals into the glass during the treatment, and the tools and furnace materials used are usually subjected to thorough purification before such treatment.

However, the present inventors have found that it is virtually impossible to eliminate sodium from the environment where the glass is treated. It has recently been found by the present inventors that, in connection with efforts in shaping high purity fused silica glass at above 1300° C., even if the furnace materials and tools used are thoroughly purified before-hand, and care is taken not to introduce extraneous sodium into the furnace, high purity fused silica glass having alkali concentration on the ppb level treated at above 1300° C. are usually contaminated if treated only in the presence of a high purity helium atmosphere—sodium concentration in the surface region increased to a level unacceptable for use in optical members for ArF lithographic devices. Thus, the skin portion with a high sodium concentration must be removed to leave the useable core. This leads to a low yield of the useable glass. The low yield and de-skinning step translate into high cost of the material. Therefore, it is desired, and under many situations required, that the sodium present in the environment, especially the atmosphere in which the glass is treated, be reduced, in addition to the prior purification of tools and furnace materials mentioned above.

The present inventors devised the process of the present invention to solve the problem of inhibiting sodium contamination of fused silica glass during high temperature treatment thereof. The solution resides in the use of a flow of purifying atmosphere comprising a cleansing gas during the treatment, thus reducing the sodium level in the atmosphere on an ongoing basis during the treatment. Whereas the process of the present invention was initially designed for use in the treatment of high purity fused silica glass, it can also be used in the treatment of any other crystalline, glass or glass-ceramic material, as long as the purifying atmosphere does not negatively affect the desired properties of the material to be treated to an unacceptable extent.

Chlorine ($Cl_2$) has been used in the purification of various inorganic materials such as graphite, zircon, zirconia, and other refractories. For example, U.S. Pat. No. 6,174,509 to Pavlik, Jr. et al. discloses treating refractories in a halogen-containing atmosphere whereby the halogen reacts with and removes the contaminating metals from at least the exposed surface of the refractory. It is disclosed in this patent that chlorine or fluorine, alone or in acid gas form, to be especially useful. It is also disclosed in this patent that for zircon, the cleansing action can occur at a temperature as low as 700° C. However, it is usually preferred to employ somewhat higher temperatures in the range of 1100 to 1500° C. It is stated in this patent that at above 1500° C., zircon starts to thermally dissociate, resulting in a weaker refractory. It is suggested that the sodium level below 300 ppm of the zircon refractory thus treated in that patent can be achieved. In another reference, Robert S. Pavlik Jr. et al., *Purification of Porous Zircon by Carbochlorination*, J. Am. Ceram. Soc., 87 [9] 1653-1658 (September 2004), it is disclosed that zircon refractory can be purified by carbochlorination due to the following simplified reaction:

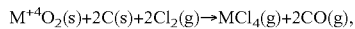

$$M^{+4}O_2(s) + 2C(s) + 2Cl_2(g) \rightarrow MCl_4(g) + 2CO(g),$$

where M represents tramped metals in the zircon refractory. The reaction product $MCl_4$ typically has a lower boiling point than $M^{+4}O_2$. By removing the formed $MCl_4$ gas, the tramp metals are thus reduced from the refractory.

Whereas these references teach that halogen-containing gas may be effective in reducing metal concentration in solid materials, such teachings are all in the context of purifying porous materials having a high initial metal concentration at least on the scale of several hundred ppm. Moreover, such teachings are limited to treatment at temperature lower than about 1500° C.

It is known that for most metal ions, the higher the temperature, the larger its diffusivity in solids, especially in glass materials such as fused silica. At certain temperature, its diffusivity may increase dramatically. Given the high diffusivity of metal ions, especially small ions such as sodium at high temperatures, from these references alone, it is not clear whether such gas can be effectively used in controlling metal contamination of high purity material below ppm level, such as on the hundreds of ppb level, much less on the tens of or several ppb level. It has been suspected that, due to the high diffusivity of sodium at elevated temperatures in solid materials, especially glass materials such as fused silica, sodium may be absorbed from the treatment atmosphere and become enriched in the glass material during the high temperature treatment, even if the sodium concentration in the atmosphere is controlled at a very low level. When such treatment undergoes at a temperature higher than 1500° C., as is required in the reforming of fused silica glass, such issues become more complex and more pronounced: the thermodynamics and kinetics of chemical reactions involved between the materials and atmosphere change. Moreover, it is known that certain elements, such as chlorine, though effective as purifying agent, in and of itself is detrimental to the optical performance of fused silica glass at interesting wavelengths such as that of a KrF or ArF laser if included into the glass. At high temperatures, especially above 1000° C., such as above 1500° C., its diffusion into the glass and/or reaction with the materials treated may adversely affect the property of the materials treated to such an extent that it becomes unusable.

Surprisingly, the present inventors have found that, by including a cleansing gas in the treatment atmosphere, control of metal contamination of the treated materials under ppm level, even down to ppb level, is feasible. A material thus treated was high purity fused silica glass. By using the process of the present invention, the sodium concentration in the surface region of the high purity fused silica glass did not increase significantly, and can be controlled within five times the initial concentration before treatment. It is believed that the contaminations by other metal ions are controlled as well by the method of the present invention.

The cleansing gas included in the purifying atmosphere in the process of the present invention may advantageously be selected from $F_2$, $Cl_2$, $Br_2$, and halogen-containing compounds such as HF, HCl, HBr, $CF_cCl_dBr_e$ and $SF_xCl_yBr_z$, where c, d, e, x, y and z are non-negative integers, c+d+e=4 and x+y+z=6, and compatible mixtures thereof. In certain embodiments advantageously, when treating glass materials such as fused silica, the cleansing gas is $Cl_2$. In one embodiment of the process of the present invention, the purifying atmosphere comprises, in addition to the cleansing gas, an inert gas preferably selected from $N_2$ and rare gases such as He, Ne, Ar, Kr and mixtures thereof. The choice of the cleansing gas and other components of the purifying atmosphere are determined by various factors such as cleansing effectiveness, level of metal ion in the treatment environment, safety concerns, reactivity with furnace material, environmental concerns, controllability and cost. Typically, these gases and agents are required of a high purity such that they do not act as a significant source of the impurities. Moreover, the cleansing gas should not react with the treated material in a manner that causes significant detrimental effect to the desired physical properties of the materials thus treated. Preferably, the cleansing gas causes a neutral or positive effect to the desired physical properties of the materials if included therein during the treatment. For example, when treating high purity fused silica glass, fluorine-containing cleansing gas may be advantageously used. This is because, though fluorine is known to diffuse rather quickly in fused silica at temperatures above 1000° C., especially above 1500° C., it is also known that it does not detrimentally affect the optical properties of high purity fused silica for use in lithographic devices in deep UV and vacuum UV regions. Rather, because fluorine may serve to displace chlorine in the glass because its bonding with the glass backbone is more thermodynamically favored at high temperatures, use of fluorine-containing cleansing gas may improve the optical performance of the glass.

The purifying atmosphere may consist of only cleansing gases. It is also possible that the purifying atmosphere comprises inert gas in addition to the cleansing gases. The concentration of the cleansing gas in the purifying atmosphere is not critical. For example, it may range from 1% to 100% by volume. The choice of concentration of the cleansing gas in the purifying atmosphere is dependent on a plurality of factors: treatment time; treatment temperature; the effectiveness of the cleansing gas in reacting with and reducing the metals in the materials treated; the desired level of metals in the materials treated, the reactivity and controllability of the cleansing gas, and the like. Generally, the longer the treatment time, and the lower the required level of metal concentration in the finally treated material, and the lower the effectiveness of the cleansing gas in removing metals, the higher the concentration of the cleansing gas in the purifying gas is desired. The pressure of the purifying gas is not critical either. The pressure may remain constant during the treatment process, or may vary periodically. If toxic cleansing gas is used in the furnace, it is desired that the total pressure of the purifying atmosphere is below the ambient pressure.

The purifying atmosphere may be a continuous flow during the heat treatment. Alternatively, in a preferred embodiment, the purifying atmosphere is introduced into the treatment environment, such as a furnace, as a pulsed flow. By "pulsed flow," it is meant that during certain time intervals, the purifying atmosphere is confined in the treatment environment such as the furnace with or without substantial artificial agitation, followed by evacuation and/or replacement thereof with fresh purifying gas. At the end of treatment, inert gas is usually used to fill in the furnace chamber before the material is allowed to cool down to room temperature. It has been found that repeated pulsed flow is quite effective in removing metals in the treatment environment presumably because the cleansing gas is allowed to react with the metals for sufficient time while confined in the furnace chamber before it is evacuated. Evacuation of the reacted purifying atmosphere is advantageously done by reducing the pressure of the atmosphere in the chamber to, for example, lower than 100 torr (13.3 kPa), in certain embodiments advantageously lower than 30 (4.00 kPa) torr, in certain embodiments advantageously lower than 10 torr (1.33 kPa), still in certain embodiments advantageously lower than 1 torr (133 Pa), before refilling fresh purifying gas or inert gas. Robert S. Pavlik Jr. et al, *Purification of Porous Zircon by Carbochlornation*, J. Am. Ceram. Soc., 87 [9] 1653-1658 (September 2004) describes a pulsed flow regimen for purifying zircon, which may be adapted for use in the heat treatment process of the present invention. The pulsed flow regimen as described in this reference comprises: introducing a mixture of $Cl_2$ and He gases into the furnace, wherein the $Cl_2$ gas content was adjusted to ensure that enough was present to allow sufficient reaction of all impurities present in the zircon refractory; increasing the absolute pressure in the furnace to just below atmospheric pressure; pumping out the gas in the furnace chamber by a vacuum pump thereby removing the volatile reaction products; scrubbing the waste gas; and repeating the gas filling and pumping steps.

In order to effectively remove metals, especially sodium and other alkali contaminants from the treatment atmosphere, it is desired that the purifying atmosphere is employed when the temperature is at least 1000° C., more desirably when the temperature is at least 900° C., still more desirably when the temperature is at least 800° C. The present inventors have found that sodium tends to evaporate significantly from the tools and furnace materials when the temperature is higher than 1000° C. When heated to about 1200° C., such sodium evaporation is especially pronounced. However, around this temperature, such as between 1150-1300° C., the diffusivity of sodium in fused silica glass is not very high. Therefore, it is highly desired that during the treatment, the furnace is maintained at a temperature between 1150-1350° C. for a period of at least 10 minutes, in certain embodiments advantageously at least 20 minutes, in certain embodiments advantageously at least 30 minutes, in certain embodiments at least one hour, in certain other embodiments at least 2 hours, in certain other embodiments at least 3 hours, to remove most of the sodium evaporated in that temperature range. In the early stage of the treatment, because relatively small amount of sodium is removed, the concentration of sodium in the atmosphere can reach a relatively high level when the sodium ions are mobilized. At a later stage when the temperature is brought to even higher, because the mobility and diffusivity of sodium and other metals increase, it is desired that the purifying atmosphere is employed during the entire treatment process, including both the heating up, the holding at certain temperatures and the cooling down processes, as long as the temperature remains higher than 1000° C., in certain embodiments advantageously when the temperature is higher than about 900° C., in certain embodiments advantageously when the temperature is higher than about 800° C., either continuously or in a pulsed manner. For example, for the reforming of high purity fused silica glass, it is often desired that the glass is heated to a temperature as high as 1700° C. Thus, during the entire reforming process, as long as the temperature is higher than 1000° C., in certain embodiments advantageously when the temperature is higher than 900° C., in certain embodiments advantageously when the temperature is higher than 800° C., such as during the periods the temperature of the furnace increases (the preheating process), the glass reflows or is reformed (around the peak temperature), the temperature of the furnace decreases (the cooling process), the purifying atmosphere is employed.

In order to obtain post-treatment materials with a low level of metal contaminants, especially in the surface region, it is highly desired that the refractory materials for constructing the furnace in which intended treatment is conducted are purified to a low level of metal, and the tools used in handling the materials to be treated are made by low-metal materials as well. When treating high purity fused silica glass material, a preferred furnace material is graphite. In certain embodiments advantageously, the graphite material itself is permeable to the cleansing gas, so that it may be thoroughly purified before being used as the furnace material. In addition, porous graphite may be further purified during the treatment period by the cleansing gas in the purifying atmosphere as well. Other refractory materials may be employed, provided they meet the purity requirement, and do not degrade to an unacceptable level due to reactions with the cleansing gas, if they react with the cleansing gas at all. For example, when treating high purity fused silica glass in the presence of $Cl_2$, the furnace material may be, in addition to graphite, SiC, BN, and the like. In certain embodiments advantageously, the surface region of the furnace material exposed to the purifying atmosphere during the treatment process has a sodium concentration of lower than 5[Na](at), in certain embodiments advantageously lower than 2[Na](at), still in certain embodiments advantageously lower than [Na](at), in certain embodiments advantageously lower than 0.5[Na](at).

It has been demonstrated that, by using $Cl_2$ as the cleansing gas, in a graphite furnace, by heat treating a high purity fused silica glass having a before-treatment sodium concentration [Na](bt) in the surface region to a temperature up to about 1800° C., the after-treatment sodium concentration [Na](at) in the surface region can be maintained at a level $\leq 5[Na](bt)$, and advantageously $\leq 2[Na](bt)$. It is believed that, by changing the process parameters, $[Na](at) \leq [Na](bt)$, and even $[Na](at) \leq 0.5 [Na](bt)$ can be achieved. It has been demonstrated that, for high purity fused silica glass with $[Na](bt) \leq 10$ ppb by weight, by using the process of the present invention, $[Na](at) \leq 10$ ppb by weight, in some embodiments, $[Na](at) \leq 5$ ppb, in other embodiments, $[Na](at) \leq 2$ ppb, in still other embodiments, $[Na](at) \leq 1$ ppb, can be achieved.

Preferably, in the process of the present invention, the material has a before-treatment initial concentration of at least one metal M in the surface region, [M](bt), and an after-treatment concentration of metal M in the surface region, [M](at), and $[M](at) \leq 5 [M](bt)$, in certain embodiments advantageously $[M](at) \leq 2 [M](bt)$, in certain embodiments advantageously $[M](at) \leq [M](bt)$, in certain embodiments advantageously $[M](at) \leq 0.5 [M](bt)$, and M is selected from alkali metals other than sodium, alkaline earth metals and transition metals. In certain embodiments advantageously, for each individual metal M, $[M](bt) \leq 5$ ppb by weight. In certain embodiments advantageously, for all metal M and sodium, $\Sigma([M](bt)+[Na](bt)) \leq 100$ ppb by weight. For high purity fused silica glass, the metal M of greatest concern includes sodium, potassium and copper (I).

The low-sodium, low-metal fused silica glass material of the present invention prepared and treated according to the process of the present invention is particularly suitable for the production of optical members used in deep UV and vacuum UV microlithography devices. They tend to have excellent optical properties, especially high transmission and high laser damage resistance at such short wavelengths. High purity fused silica glass can be treated in accordance with the process of the present invention with a high yield because the metal contamination in the surface region is insignificant. Surprisingly, the use of $Cl_2$ as the cleansing gas does not significantly reduce the performance of the glass or reduce the yield of high quality glass. Without intending to be bound by any particular theory, the present inventors believe this is presumably due to the relatively low diffusivity of Cl in silica, even at temperatures as high as 1800° C.

The following non-limiting example further illustrate the present invention as claimed. The examples are provided for illustration purpose only, and shall not be interpreted to limit the present invention as claimed in any way.

EXAMPLES

Example 1 (The Present Invention)

Furnace set-up is schematically illustrated in FIG. 1. High purity fused silica glass 104 having an initial sodium concentration were treated in a graphite furnace 101. The graphite walls 103 of the furnace were pre-conditioned to a low level of sodium. The furnace 101 was purged with pure $N_2$ gas at room temperature. A mixture of $N_2/Cl_2$ was then introduced into the furnace 101 via an inlet 105. The furnace 101 was then heated to about 1200° C., where it was held for about 30 minutes. Afterwards, the furnace 101 was vacuumed by a pump 109 via an outlet 107 to less than 100 Pa. Subsequently, the furnace was refilled with $N_2/Cl_2$ mixture and heated to 1765° C. Subsequently the furnace 101 was evacuated, refilled with $N_2/Cl_2$ and cooled to room temperature. The sodium concentration profile in the treated sample was then characterized and reported in FIG. 2.

Example 2 (Comparative Example)

The procedures are essentially the same as Example 1, except that where $N_2/Cl_2$ was used in Example 1, pure $N_2$ was used instead. The sodium concentration profile in the treated sample was then characterized and reported in FIG. 2.

Figure 2:
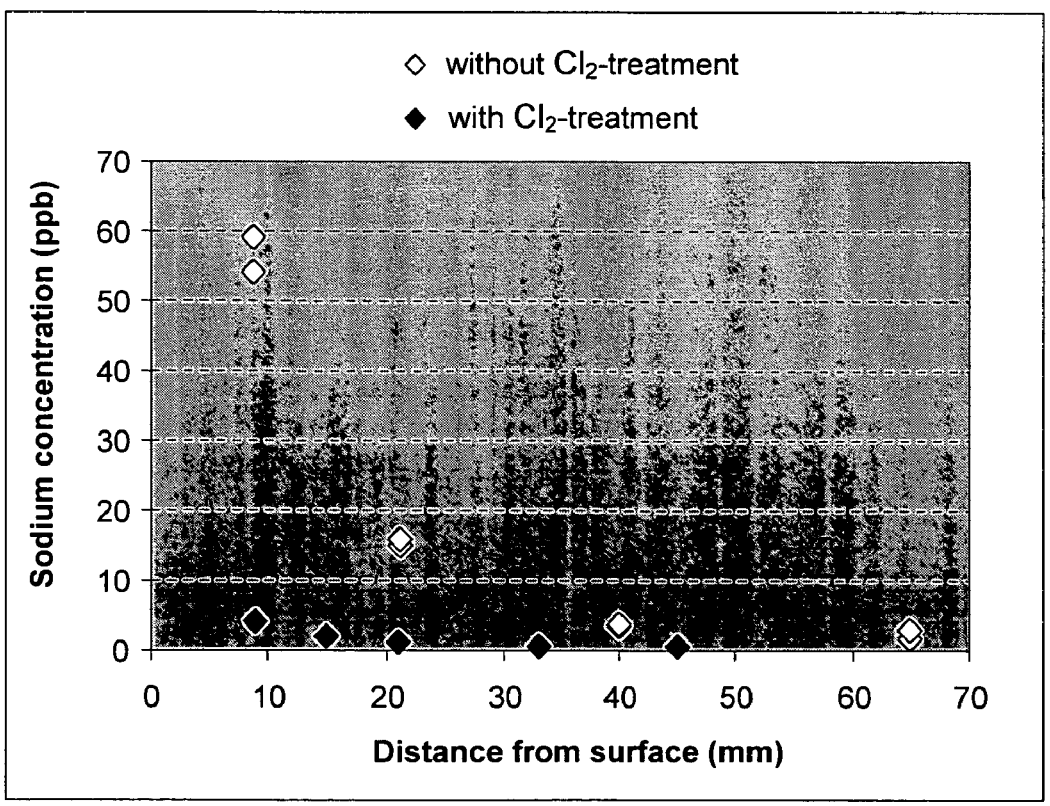
FIG. 2 is a diagram showing the sodium concentration distribution as a function of the depth of the sample of two high purity fused silica glass samples, one treated according to the present invention, one not.

From FIG. 2, it is quite clear that the process of the present invention successfully inhibited sodium contamination of the high purity silica glass during the heat treatment. The surface region of the glass treated according to the present invention has a substantially lower concentration of sodium, and sodium penetrated to a much lower thickness into the sample. A large surface portion of the sample treated in the comparative example would have to be removed if the glass were to be used for lens elements of ArF lithographic devices. Whereas for the sample treated according to the present invention, a much smaller portion, if any, have sodium concentration higher than the acceptable upper limit.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A method for treating a glass at a high temperature having a before-treatment initial sodium concentration of [Na](bt) in the surface region lower than 300 ppm, wherein (i) the glass is treated in a purifying atmosphere comprising a cleansing gas selected from $F_2$, $Cl_2$, $Br_2$, a halogen-containing compound, and compatible mixtures thereof; (ii) the atmosphere is maintained to have a purity such that at the end of the heat treatment, in the surface region of the treated glass, the after-treatment sodium concentration is [Na](at), wherein [Na](at)≦10 ppb by weight; and (iii) the glass is reflowed, reformed, sagged, or drawn at a temperature of at least 1700° C. under the purifying atmosphere.

2. A method in accordance with claim 1, wherein the purifying atmosphere is a continuously flowing gas or gas mixture.

3. A method in accordance with claim 1, wherein the purifying atmosphere is a pulsed flow of gas or gas mixture.

4. A method in accordance with claim 1, wherein the purifying atmosphere comprises $Cl_2$.

5. A method in accordance with claim 1, wherein the cleansing gas is fluorine-containing.

6. A method in accordance with claim 1, wherein the material treated is high purity fused silica glass.

7. A method in accordance with claim 6, wherein the glass being treated is high purity fused silica glass with [Na](at) ≦10 ppb by weight in the surface region.

8. A method in accordance with claim 1, wherein the glass has a before-treatment initial concentration of at least one metal M in the surface region, [M](bt), and an after-treatment concentration of metal M in the surface region, [M](at), and [M](at)≦[M](bt), and M is selected from alkali metals other than sodium; alkaline earth metals and transition metals.

9. A method in accordance with claim 8, wherein for each individual metal M, [M](bt)≦100 ppm.

10. A method in accordance with claim 8, wherein the glass is silica glass, and for each individual metal M, [M](at)≦10 ppb by weight.

11. A method in accordance with claim 8, wherein for all metal M and sodium, $\Sigma$([M](bt)+[Na](bt))≦100 ppb by weight.

12. A method in accordance with claim 1, wherein the treatment is conducted in a furnace constructed with graphite.

13. A method in accordance with claim 12, wherein the graphite is permeable to the cleansing gas.

14. A method in accordance with claim 6, wherein the treatment comprises subjecting the fused silica glass to a temperature higher than about 1300° C.

15. A method in accordance with claim 6, wherein the treatment comprises subjecting the fused silica glass to a continuous flow or a pulsed flow of the purifying atmosphere at least when the temperature is between about 800-1300° C.

16. A method in accordance with claim 15, wherein the treatment comprises subjecting the fused silica glass to the continuous flow or the pulsed flow of purifying atmosphere during the whole period when the temperature is higher than about 800° C.

* * * * *